(12) United States Patent
Suzuki et al.

(10) Patent No.: US 8,443,017 B2
(45) Date of Patent: May 14, 2013

(54) DIGITAL DATA PROCESSOR

(75) Inventors: Ryoji Suzuki, Nara (JP); Yusuke Mori, Osaka (JP)

(73) Assignee: Panasonic Corporation, Osaka (JP)

( * ) Notice: Subject to any disclaimer, the term of this patent is extended or adjusted under 35 U.S.C. 154(b) by 614 days.

(21) Appl. No.: 12/758,198

(22) Filed: Apr. 12, 2010

(65) Prior Publication Data

US 2010/0262639 A1    Oct. 14, 2010

(30) Foreign Application Priority Data

Apr. 13, 2009   (JP) .................................. 2009-096830

(51) Int. Cl.
*G06F 7/00*    (2006.01)

(52) U.S. Cl.
USPC ........................................................ 708/200

(58) Field of Classification Search ........................ None
See application file for complete search history.

(56) References Cited

U.S. PATENT DOCUMENTS

| | | | |
|---|---|---|---|
| 5,978,822 A * | 11/1999 | Muwafi et al. | 708/209 |
| 6,064,367 A | 5/2000 | Horioka | |
| 2010/0262639 A1 * | 10/2010 | Suzuki et al. | 708/201 |

FOREIGN PATENT DOCUMENTS

WO    2007/069369    6/2007

OTHER PUBLICATIONS

European Search Report issued Nov. 28, 2011 in Application No. EP 10 15 9789.
Su-Ming Koh et al., "A Novel Digital Audio Processing Scheme Based on Bit Expansion Asynchronous Dithering", Consumer Electronics, 2006, ICCE '06, 2006 Digest of Technical Papers, International Conference on Las Vegas, NV, USA Jan. 7-11, 2006, Piscataway, NJ, USA, IEEE, pp. 9-10.

* cited by examiner

*Primary Examiner* — David H Malzahn
(74) *Attorney, Agent, or Firm* — Wenderoth, Lind & Ponack, L.L.P.

(57) ABSTRACT

A digital data processor which receives an N-bit input signal from a data source and converts the N-bit input signal into an M-bit output signal, the M-bit being larger than the N-bit. The digital data processor includes: an weighted addition circuit which is operable to perform weighted addition on at least the input signal and a signal being time-shifted with respect to the input signal and output as a weighted added input signal; an arithmetic shift circuit which is operable to perform an arithmetic rightward shift operation on the weighted added input signal for a predetermined number of shifts and output as a processed input signal; a bit extension circuit which is operable to attach a predetermined bits to an LSD side of the input signal to generate an intermediate signal of M bits; and an addition circuit which is operable to perform addition of the intermediate signal and the processed input signal so as to generate the M-bit output signal.

14 Claims, 11 Drawing Sheets

DIGITAL DATA PROCESSOR

BACKGROUND OF THE INVENTION

1. Field of the Invention

The present invention relates to a digital data processor, and particularly relates to a digital data processor which extends an N-bit quantized digital data signal to a quantized digital data signal having an M-bit width (M>N).

2. Description of the Related Art

In relatively new standards used for digital versatile discs (DVD), Blu-ray discs (BD) and the like, an audio signal can be recorded not only as a 16-bit quantized data signal like as a compact disc digital audio (CDDA), but as a 24-bit quantized data signal with higher accuracy. With the advanced standards for DVD and BD and the progress in hardware implementation techniques, an accuracy of an audio DA converter has been improved and 24-bit ICs for such purpose and also 32-bit ICs with further higher accuracy have appeared. On the other hand, CDs are still major media for musical packages and 16-bit quantization accuracy remains to be used in CDDA due to its standard. Hence, it is getting harder to say that the audio quality of CDs is sufficient as compared with the new standards used for DVDs, BDs and the like. For this reason, when quantization accuracy of data signal is not sufficient, it is required to virtually increase the number of quantization bits (quantization bit depth) of the audio data signal so as to improve its audio quality.

Under such circumstance, a technique disclosed in JP 2004-180017 A is known as a technique for extending the number of audio signal's quantization bits in audio signal processing. In the technique of JP 2004-180017 A, first, a change point from/to an increase (positive) to/from a decrease (negative) is extracted from a data waveform made up of a plurality of N-bit quantized data signals aligned along time series, and subsequently, a data waveform change mode, such as (positive, positive, positive, negative), is generated from a plurality of change points. Based upon the waveform change mode, a data waveform change pattern of M bits (N<M) is read from a table previously stored into a memory, and an original audio signal is replaced with it.

SUMMARY OF THE INVENTION

However, in the audio signal processor of above mentioned JP 2004-180017 A, a large memory capacity as well as a large number of memory reference processing are required for an M-bit data waveform (N<M) generating process in which the wave form change patters are allocated from the table previously stored into a memory according to a type of processing being previously defined based upon the generated data waveform change mode pattern. Such processing is not suitable for processors such as a digital signal processor (DSP) which is exclusively used for digital signal processing.

Hence there is a very high demand especially in the consumer appliances field for a method and a device being capable of extending a bit-width of an audio signal through a simplified arithmetic processing and with a required memory capacity being smaller than that required in the method of JP 2004-180017 A so that an audio signal with high resolution and high quality can be generated.

In view of the problem in the above related art, it is one object of the present invention to provide a quantized data processor and a quantized data processing method being capable of processing an N-bit quantized data signal with the use of simplified computational processing to extend the bit width thereof so as to generate an M-bit width quantized data signal (M>N).

In one aspect, the present invention provides a digital data processor which receives an N-bit input signal from a data source and converts the N-bit input signal into an M-bit output signal, the M-bit being larger than the N-bit. The digital data processor includes: an weighted addition circuit which is operable to perform weighted addition on at least the input signal and a signal being time-shifted with respect to the input signal and output as a weighted added input signal; an arithmetic shift circuit which is operable to perform an arithmetic rightward shift operation on the weighted added input signal for a predetermined number of shifts and output as a processed input signal; a bit extension circuit which is operable to attach a predetermined bits to an LSB side of the input signal to generate an intermediate signal of M bits; and an addition circuit which is operable to perform addition of the intermediate signal and the processed input signal so as to generate the M-bit output signal.

In one aspect of the present invention, it is preferable that the predetermined bits that is added to the input signal by the bit extension circuit is zero having (M−N) digits.

In one aspect of the present invention, it is preferable that the input signal is a signal representing an N-bit quantized digital data which is generated through sampling with a predetermined sampling frequency and quantization, the weighted addition circuit has a weighted addition operation control unit which is operable to get information on the sampling frequency of the input signal from the data source, and the weighted addition operation control unit decides the number of signals to be added in the weighted addition and a factor for the weighted addition based upon the information on the sampling frequency.

In one aspect of the present invention it is preferable that the digital data processor further includes a number-of-shift deciding unit which is operable to direct the number of shifts of the arithmetic rightward shift operation performed by the arithmetic shift circuit, wherein the number-of-shift deciding unit is operable to get information on the number of bits of the input signal from the data source and decides the number of shifts of the arithmetic rightward shift operation performed by the arithmetic shift circuit based upon the information on the number of bits.

In one aspect of the present invention, it is preferable that the number-of-shift deciding unit is operable to decide the number of shifts of the arithmetic right shift operation performed by the arithmetic shift circuit such that the number of shifts increases with increase in the number of bits.

In one aspect of the present invention, it is preferable that the digital data processor further includes: a number-of-shift deciding unit which is operable to direct the number of shifts of the arithmetic rightward shift operation performed by the arithmetic shift circuit; and a number-of-shift selecting unit which is operable to transmit selected number of shifts selected by a user to the number-of-shift deciding unit, wherein the number-of-shift deciding unit is operable to decide the number of shifts of the arithmetic rightward shift operation performed by the arithmetic shift circuit based upon the selected number of shifts.

In another aspect, the present invention provides a digital data processor which receives an N-bit input signal from a data source and converts the N-bit input signal into an M-bit output signal, the M-bit being larger than the N-bit. The digital data processor includes: an amplification circuit which is operable to receive the input signal, multiply a value of the input signal by a magnification ratio which is determined in accordance with an absolute value of the value of the input signal, and output as a conversion signal; an arithmetic shift circuit which is operable to perform an arithmetic rightward shift operation on the conversion signal for a predetermined number of shifts and output as a processed input signal; a bit extension circuit which is operable to attach a predetermined bits to an LSB side of the input signal to generate an intermediate signal of M bits; and an addition circuit which is operable to perform addition of the intermediate signal and the processed input signal to generate the M-bit output signal.

In another aspect of the present invention, it is preferable that the amplification circuit is operable to output a logarithm of the absolute value of the value of the input signal as the conversion signal.

In another aspect of the present invention, it is preferable that the amplification circuit is operable to output a value as the conversion signal which is obtained through subtracting a value obtained by doubling the absolute value of the value of the input signal from a value obtained by squaring the value of the input signal.

In another aspect of the present invention, it is preferable that the digital data processor further includes a number-of-shift deciding unit which is operable to direct the number of shifts of the arithmetic rightward shift operation performed by the arithmetic shift circuit, wherein the number-of-shift deciding unit is operable to get information on the number of bits of the input signal from the data source and decides the number of shifts of the arithmetic rightward shift operation performed by the arithmetic shift circuit based upon the information on the number of bits.

In another aspect of the present invention, it is preferable that the number-of-shift deciding unit decides the number of shifts of the arithmetic rightward shift operation performed by the arithmetic shift circuit such that the number of shifts increases with increase in the number of bits.

In another aspect of the present invention, it is preferable that the digital data processor further includes: a number-of-shift deciding unit which is operable to direct the number of shifts of the arithmetic rightward shift operation performed by the arithmetic shift circuit; and a number-of-shift selecting unit which is operable to transmit selected number of shifts selected by a user to the number-of-shift deciding unit, wherein the number-of-shift deciding unit is operable to decide the number of shifts of the arithmetic rightward shift operation performed by the arithmetic shift circuit based upon the selected number of shifts.

In still another aspect, the present invention provides a data processing method which a digital data processor performs. The digital data processor receives an input signal stream including an N-bit input signal from a data source and converts the N-bit input signal into an M-bit output signal. The M-bit is larger than the N-bit. The method includes: performing weighted addition of at least the input signal and a signal being time-shifted with respect to the input signal, both being included in the input signal stream to output as a weighted added input signal by a first computation circuit of the digital data processor; performing an arithmetic rightward shift operation on the weighted added input signal for a predetermined number of shifts to output as a processed input signal by a second computation circuit of the digital data processor; attaching a predetermined bits to an LSB side of the input signal to generate an intermediate signal of M bits by a third computation circuit of the digital data processor; and adding the intermediate signal to the processed input signal to generate the M-bit output signal by a fourth computation circuit of the digital data processor.

In yet another aspect, the present invention provides a data processing method which a digital data processor performs. The digital data processor receives an N-bit input signal from a data source and converts the N-bit input signal into an M-bit output signal. The M-bit is larger than the N-bit. The method includes: receiving the input signal and multiplying a value of the input signal by a magnification ratio which is determined in accordance with an absolute value of the value of the input signal to output as a conversion signal by a first computation circuit of the digital data processor; performing an arithmetic rightward shift operation on the conversion signal for a predetermined number of shifts to output as a processed input signal by a second computation circuit of the digital data processor; attaching a predetermined bits to an LSB side of the input signal to generate an intermediate signal of M bits by a third computation circuit of the digital data processor; and adding the intermediate signal to the processed input signal to generate the M-bit output signal by a fourth computation circuit of the digital data processor.

The present invention is capable of expanding a bit width of a quantized data signal by extremely simplified computational processing.

DETAILED DESCRIPTION OF THE PREFERRED EMBODIMENTS

Below, embodiments of the present invention will be described in detail. Here, a quantized digital audio signal processor (hereinafter referred to as "audio signal processor") which processes at least one of digital audio signals each of which are quantized with an N-bit width and aligned along time series in a digital audio signal stream and outputs a digital audio signal having an M-bit width (M>N) is described as an embodiment of the digital data processor of the present invention.

The audio signal processor according to the embodiment is capable of generating a digital audio signal having an M-bit quantization width (quantization bit depth) from a digital audio signal having an N-bit quantization width. It is thereby possible to expand a dynamic range of an inputted digital audio signal so as to output an audio signal with high definition and quality.

The audio signal processor according to the embodiment does not need to refer to any table or the like stored in storage means during processing for extending the number of quantization bits (the quantization bit depth) of an audio signal. Further, the processing is configured with very simple computational processing, and is suitable for real time processing by a digital signal processor (DSP).

In addition, it is to be understood that the digital data processor according to the present invention is also capable of processing digital data other than an audio signal.

First Embodiment

In the following, an audio signal processor according to a first embodiment of the present invention will be described with reference to the drawings.

Figure 1:
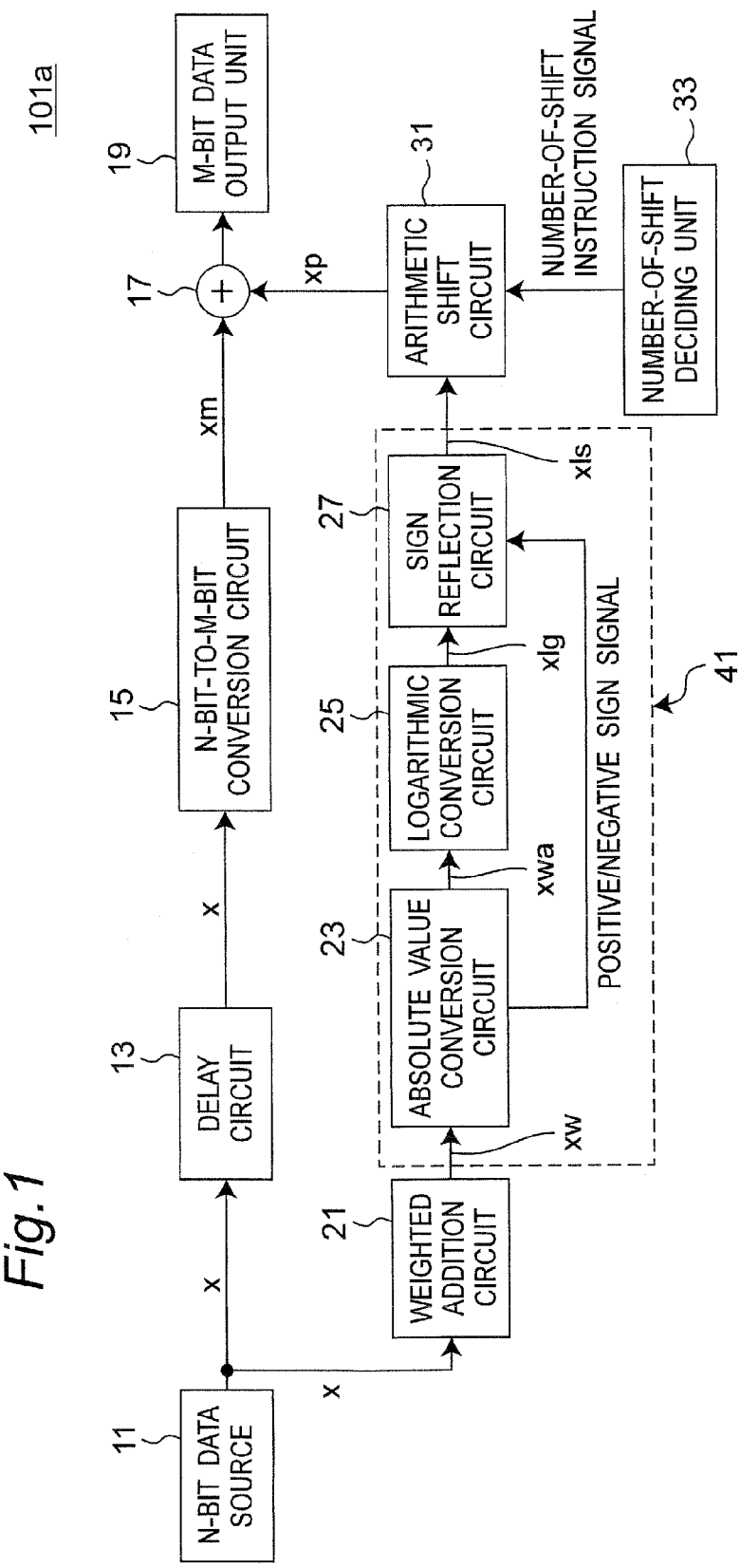
FIG. 1 is a block diagram of an audio signal processor according to a first embodiment of the present invention.

FIG. 1 is a block diagram of the audio signal processor 101a according to the present embodiment. The audio signal processor 101a includes: a delay circuit 13, an N-bit-to-M-bit conversion circuit 15, a weighted addition circuit 21, an absolute value conversion circuit 23, a logarithmic conversion circuit 25, a sign reflection circuit 27, an arithmetic shift circuit 31, an addition circuit 17, and an output terminal (an M-bit data output unit 19). In the audio signal processor 101a, an input side terminal is connected with an N-bit data source 11 which outputs an N-bit quantized digital audio signal (hereinafter simply referred to as "audio signal").

The absolute value conversion circuit 23, the logarithmic conversion circuit 25 and the sign reflection circuit 27 constitute a small amplitude signal amplification unit 41. The small amplitude signal amplification unit 41 can amplify amplitude of an inputted audio signal of which absolute value, namely, of which amplitude, is relatively small in the entire range of values that the absolute value (magnitude of the amplitude) can take, and then output the amplified signal.

In addition, the audio signal processor 101a may be provided with a number-of-shift deciding unit 33 which outputs a number-of-shift instruction signal for directing the magnitude of arithmetic shift processing (the number of digits for which a bit string of data is shifted to an LSB side (number of shifts)). The number-of-shift deciding unit 33 may control the arithmetic shift processing by the arithmetic shift circuit 31.

Next, processing sequence in the audio signal processor 101a will be described.

First, from the N-bit data source 11 connected to the input terminal side, an N-bit digital audio signal (e.g. N=16) is inputted. It is to be noted that the digital audio signal is assumed here to be an input signal x having a value greater than or equal to −1 and smaller than 1 (x: −1≦x<1). And in order to differentiate each of the input signals aligned along a time series in the audio signal stream, the input signal x is expressed as x(t) where the t is sampled time. Here, "t" is a real number that can take a discrete value at an interval of sampling period (reciprocal of a sampling frequency).

The input signal x(t) is outputted to the delay circuit 13 and the weighted addition circuit 21.

Then, the weighted addition circuit 21 performs weighted addition among the input signal x(t) and a plurality of samples being temporally prior or subsequent thereto (e.g. x(t−1/f), x(t), x(t+(1/f), f: sampling frequency), and outputs the signal as a weighted added input signal $X_w(t)$.

Subsequently, the absolute value conversion circuit 23 converts the signed N-bit input signal (weighted added input signal $X_w(t)$), which the weighted addition circuit 21 outputs, into an absolute value and outputs the value as a weighted added absolute value signal $X_{wa}(t)$ to the logarithmic conversion circuit 25 and also outputs the sign of $X_w(t)$ as a positive/negative sign signal to the sign reflection circuit 27.

The logarithmic conversion circuit 25 performs a logarithmic conversion on the absolute value of the weighted added input signal (weighted added absolute value signal $X_{wa}(t)$), which is the output from the absolute value conversion circuit 23, and outputs the value as a logarithmic conversion signal $X_{lg}(t)$.

Based upon the positive/negative sign signal, the sign reflection circuit 27 gives a sign agreeing with the positive/negative of the input signal being weighted-added (weighted added input signal $X_w(t)$), which the absolute value conversion circuit 23 outputs, to the output from the logarithmic conversion circuit 25 (logarithmic conversion signal $X_{lg}(t)$), and outputs the signal as a signed logarithmic conversion signal $x_{ls}(t)$.

The arithmetic shift circuit 31 performs an arithmetic shift to right on the output of the sign reflection circuit 27 (signed logarithmic conversion signal $x_{ls}(t)$) just for the number of shifts based upon the number of shifts provided as the number-of-shift instruction signal provided from outside (not shown) through the number-of-shift deciding unit 33, and outputs the signal as a processed input signal $x_p(t)$. Here, the number of shifts may be N (digits), for example. If the number of shifts is set to N (digits), the processed input signal $x_p(t)$ has (M−N) digits of significant bits. Accordingly, as described later, it is advantageous that, when adding the processed input signal $x_p(t)$ to an M-bit input signal $(x_m(t))$, the number of digits of the processed input signal $x_p(t)$, in which significant information is included, agrees with the number of digits of the bits of zeroes that has been added to the M-bit input signal $(x_m(t))$.

Meanwhile, the delay circuit 13 provides the input signal with a time delay in order to compensate for a time delay that occurs in the weighted addition circuit 21.

Next, the N-bit-to-M-bit conversion circuit 15 coverts the signed N-bit input signal (x(t)) outputted from the delay circuit 13 into an M-bit input signal $(x_m(t))$ (intermediate signal) (e.g. M=24) by attaching zero data at the lower bits of the signed N-bit input signal (x(t)).

It should be noted that in the conversion into the M-bit input signal $(x_m(t))$, the N-bit-to-M-bit conversion circuit 15 may attach a smaller number of digits of zero bits than (M−N) digits at the lower bits and attach the other zero bits of remaining digits at the upper bits so as to convert the signal into the M-bit input signal $(x_m(t))$ (intermediate signal).

The adding circuit 17 adds the M-bit input signal $(x_m(t))$ (intermediate signal), which has been converted into M bits by the N-bit-to-M-bit conversion circuit 15, and the M-bit signal (processed input signal $x_p(t)$), whish has been outputted from the arithmetic shift circuit 31. It is to be noted that a word length of the arithmetic shift circuit 31 is assumed to be M bits here.

Lastly, the M-bit data output unit 19 being operable as an output terminal outputs the M-bit signal (the sum of the M-bit input signal $(x_m(t))$ and the processed input signal $x_p(t)$), which has been outputted from the adding circuit 17, as the M-bit output signal.

The arithmetic shift circuit 31 can change the number of shifts performed in the bit shift processing on an output from the sign reflection circuit 27 based upon configuration from outside (not shown) (information received as the number-of-shift instruction signal through the number-of-shift deciding unit 33).

Figure 2:
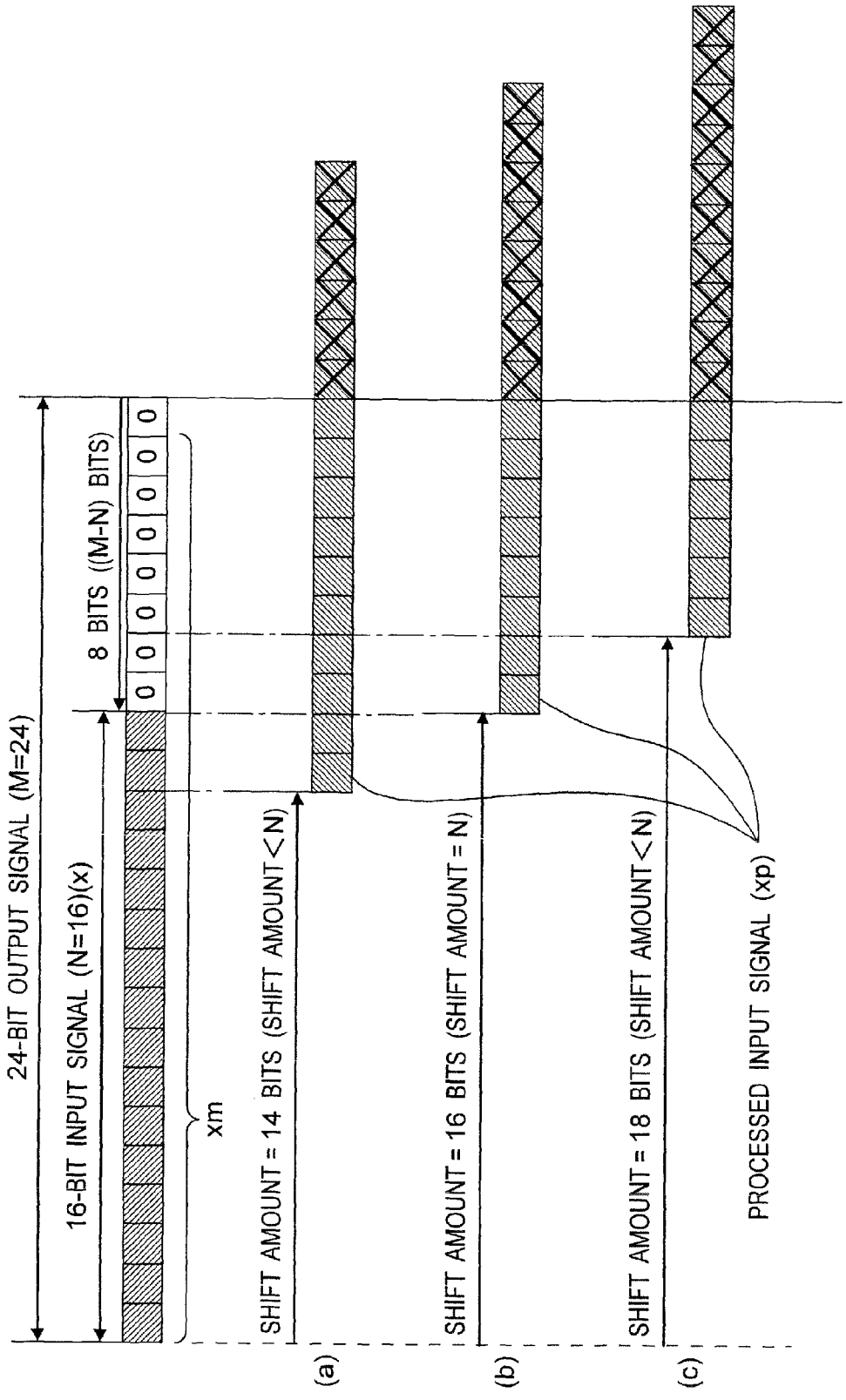
FIG. 2 is a conceptual diagram of bit extension processing performed by the audio signal processor according to the first embodiment.

FIG. 2 is a diagram showing a difference in the M-bit output signal due to a difference in the number of shifts of the rightward shift processing on an output from the sign reflection circuit 27 (signed logarithmic conversion signal $x_{ls}t$), which is performed by the arithmetic shift circuit 31.

In the audio signal processor 101*a* according to the present embodiment, the number of bits of zero attached to the LSB side of the input signal x(t), (M−N), does not have to agree with the number of bits of the processed input signal $x_p(t)$ (shift amount). FIG. 2(*a*) is a diagram of the processed input signal $x_p(t)$ in the case where the shift amount of the processed input signal $x_p(t)$ is smaller than the number of digits of zero attached to the LSB side of the input signal x(t), (M−N). Similarly, FIGS. 2 (*b*) and (*c*) are diagrams respectively showing the processed input signals $x_p(t)$ in the cases where the shift amount of the processed input signal $x_p(t)$ agrees with or is larger than the number of digits of zero attached to the LSB side of the input signal x(t), (M−N).

In the case where the shift amount<(M−N), as shown in (a) of FIG. 2, the one or more upper bits of the processed input signal $x_p(t)$ overlap the one or more lower bits of the input signal x(t). Regarding the 24-bit output signals, a signal having small amplitude is relatively strongly amplified in comparison with the other cases of the processed input signal (FIGS. 2(*b*) and (*c*)) so that a dynamic range expansion and audio quality improvement are achieved when the processed input signal $x_p(t)$ as above (FIG. 2(*a*)) is added to the M-bit input signal $x_m(t)$ to generate the M-bit output signal.

As shown in FIG. 2(*b*), the number of bits of the processed input signal $x_p(t)$ agrees with the number of bits of zero attached to the LSB side of the input signal x(t) in the case where the shift amount=(M−N). Regarding the 24-bit output signals, a signal having small amplitude is middling amplified in comparison with the other cases of the processed input signal (FIGS. 2(*a*) and (*c*)) so that a dynamic range expansion and audio quality improvement are achieved when the processed input signal $x_p(t)$ as above (FIG. 2(*b*)) is added to the M-bit input signal $x_m(t)$ to generate the M-bit output signal.

Lastly, in the case where the shift amount>(M−N), as shown in FIG. 2(*c*), one or more bit of zeroes are left between the lower bits of the input signal x(t) and the upper bits of the processed input signal $x_p(t)$. Regarding the 24-bit output signals, a signal having small amplitude is relatively weakly amplified in comparison with the other cases of the processed input signal (FIGS. 2(*a*) and (*b*)) so that a dynamic range expansion and audio quality improvement are achieved when the processed input signal $x_p(t)$ as above (FIG. 2(*c*)) is added to the M-bit input signal $x_m(t)$ to generate the M-bit output signal.

As thus described, the magnitude of the acoustic effect according to the dynamic range expansion of the input signal is able to be adjusted by changing the number of shifts in the rightward shift operation processing on an output from the sign reflection circuit 27 (signed logarithmic conversion signal $x_{ls}(t)$) performed by the arithmetic shift circuit 31.

When the arithmetic shift circuit 31 performs an arithmetic shift on the output from of the sign reflection circuit 27 (signed logarithmic conversion signal $x_{ls}(t)$) for N−1 bits rightward, its sign bit is positioned at Nth bit from the MSB. When the arithmetic shift circuit 31 performs an arithmetic shift on the output from the sign reflection circuit 27 for more than N−1 bits rightward, an absolute value of the output from the arithmetic shift circuit 31, which is to be added to the input signal, which has been converted into M bits (output from the N-bit-to-M-bit conversion circuit 15), by the adding circuit 17, becomes smaller. When the arithmetic shift circuit 31 performs an arithmetic shift on the output from the sign reflection circuit 27 for less than N−1 bits rightward, an absolute value of the output from the arithmetic shift circuit 31, which is to be added to the input signal, which has been converted into M bits (output from the N-bit-to-M-bit conversion circuit 15), by the adding circuit 17, becomes larger.

Figure 3:
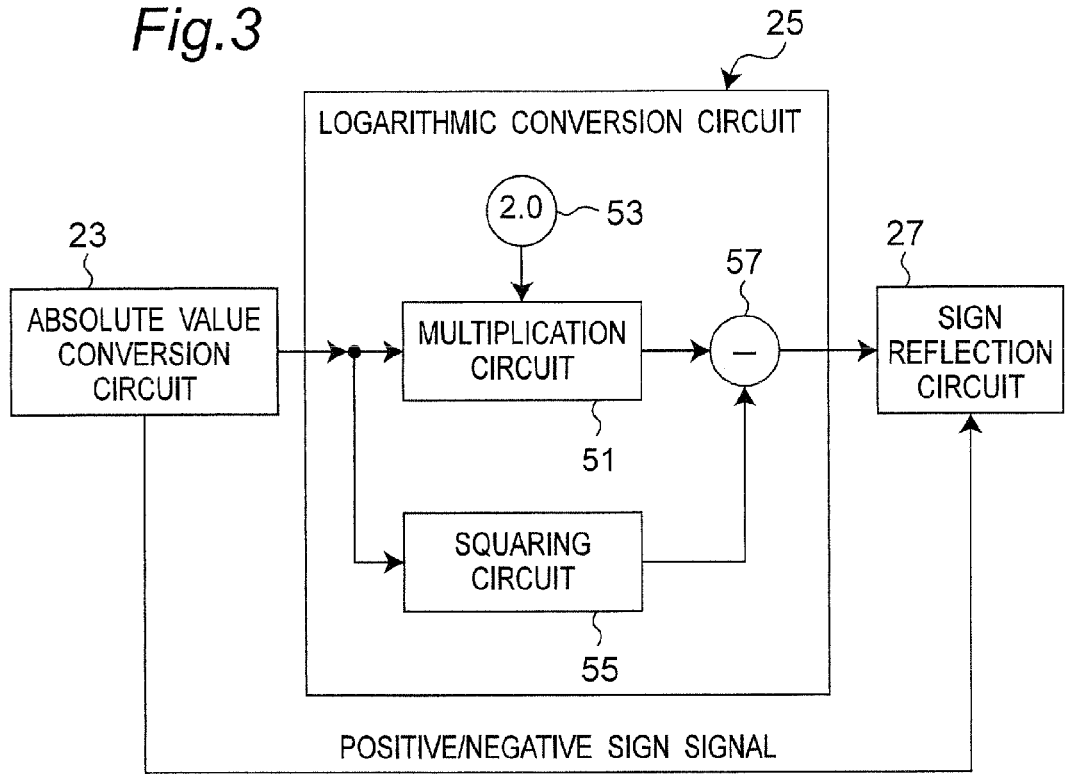
FIG. 3 is a block diagram of a logarithmic conversion circuit.

FIG. 3 is a block diagram of a configuration of the logarithmic conversion circuit 25 constituting the small amplitude signal amplification unit 41 of the audio signal processor 101*a* according to the present embodiment.

The logarithmic conversion circuit 25 has an input terminal which is operable to receive an output from the absolute value conversion circuit 23 ($X_{wa}(t)$), a multiplication circuit 51, a squaring circuit 55, a subtracting circuit 57, and an output terminal which is operable to transmit an output from the subtracting circuit 57 to the sign reflection circuit 27. The multiplication factor holding unit 53 is connected to the multiplication circuit 51 so as to output a multiplication factor being held therein.

Here, a processing for outputting a logarithm of an input is referred to as a logarithmic conversion operation. In general, the logarithmic conversion operation is performed using a table conversion, which requires a large amount of memory, or using arithmetic operations, which requires a large amount of processing, so that a high precision logarithmic conversion operation may be achieved. However, in the logarithmic conversion circuit 25 according to the present embodiment, the logarithmic conversion operation is performed using a following simplified implementation method for reducing an amount of computational operations. Hereinafter, the simplified implementation method for the logarithmic conversion will be described.

First, when expanding a function log(1+x) in the Taylor power series at x=0, the function can be expressed as Equation 1.

With respect to x satisfying −1<x≦1, $$\log(1+x) = x - (1/2)x^2 + (1/3)x^3 + \ldots + (1/r)(-1)^{(r-1)}x^r + \ldots \quad \text{(Equation 1)}$$

Here, the x to be used may be normalized such that the maximum value is +1 and the minimum value is −1, and an absolute value of |x| ($=x_{wa}(t)$) is in the range of 0≦|x|1. Further, when, for the sake of simplification, the function is approximated only by first and second terms appeared in the infinite series derived through the Taylor expansion (Equation 1), the function log(1+x) is approximately expressed as Equation 2.

$$\log(1+|x|) \sim |x| - (\tfrac{1}{2})x^2 \quad \text{(Equation 2)}$$

Further, both sides of Equation 2 are doubled to obtain a logarithmic conversion y of Equation 3 so that the range of codomain for the output may coincide with the range of the domain 0≦|x|≦1 for the input, $$y = 2\log(1+|x|) \approx 2|x| - x^2 \quad \text{(Equation 3)}$$

Figure 4A:
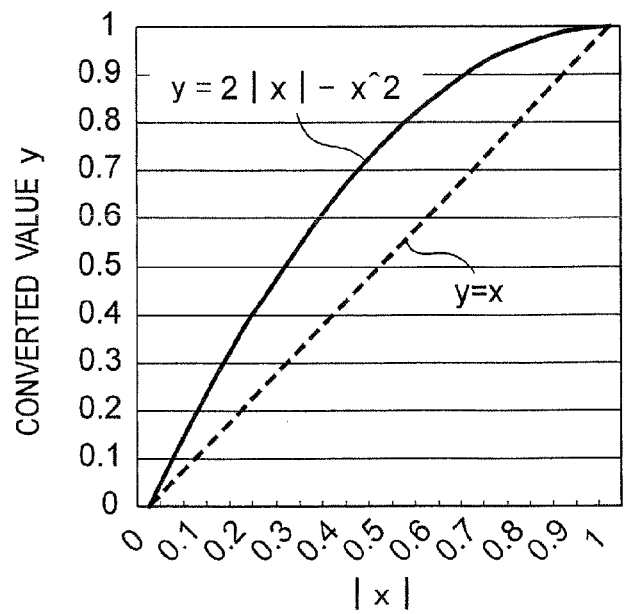
FIGS. 4A to 4C are charts each plots a relation between an input and a converted value.

As shown in FIG. 4A, when assigning an absolute value |x| (0≦|x|<1) of the input signal x, which was normalized such that the value range is from −1 to +1, to Equation 3, the result y also changes in the range of 0≦y<1. The logarithmic conversion circuit 25 of FIG. 3 is able to perform the logarithmic conversion y of Equation 3.

It is to be noted that another conversion algorithm may be used in place of the logarithmic conversion y.

Figure 4B:
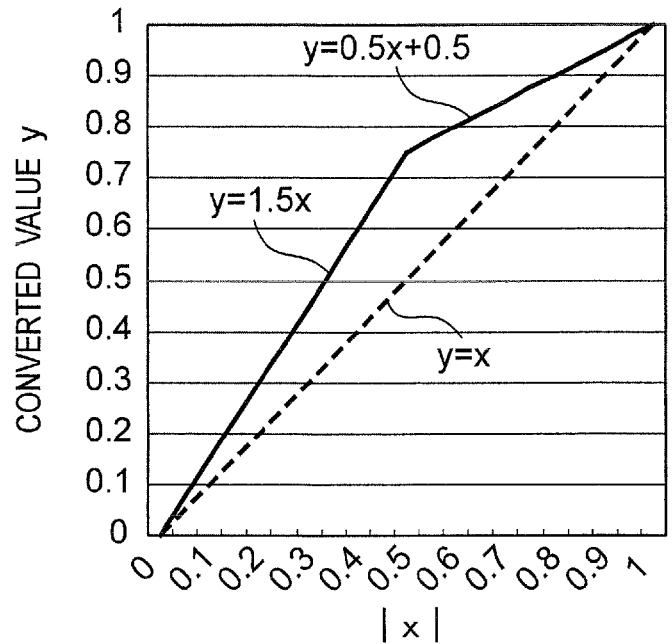

FIG. 4B shows another example of the conversion y. The conversion y shown in FIG. 4B is a conversion configured by combining two linear conversions in the middle of the domain of |x|. Also in such a linear conversion, an input having a small amplitude value can be amplified in comparison with an input having a large amplitude value.

Figure 4C:
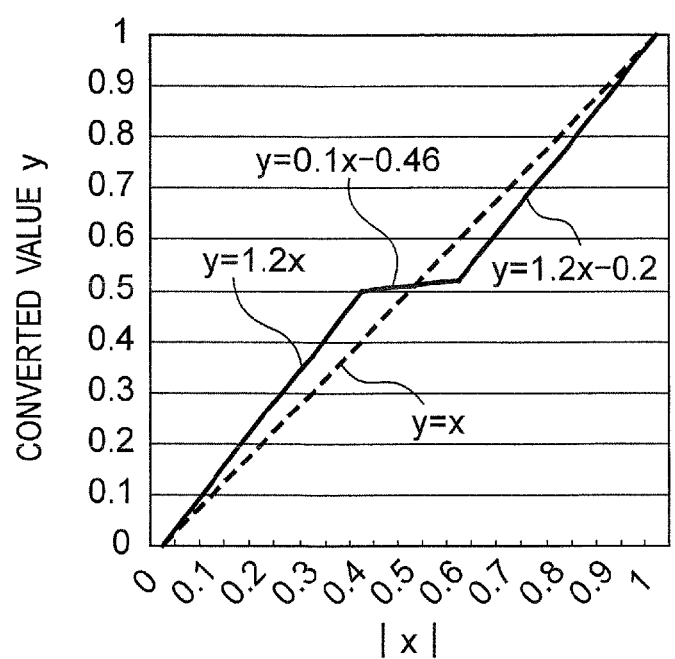

FIG. 4C shows further another example of the conversion y. The conversion y shown in FIG. 4C is a conversion configured by combining three linear conversions in the domain of |x|. Also in such a linear conversion, an input having a small amplitude value can be amplified in comparison with an input having a large amplitude value. The conversion shown in FIG. 4C converts an input (|x|) with a magnification ratio being larger than or equal to zero and smaller than 1, with a magnification being equal to 1 (identical conversion), or with a magnification ratio being larger than 1 depending on the value of the input (|x|). As thus described, any conversion that can convert at least one certain value of |x| in the domain of the input |x| with a magnification ratio being larger than 1 may be used as a conversion algorithm of a conversion circuit constituting the small amplitude signal amplification unit 41 of the present embodiment.

Although not illustrated, the conversion y may, for example, be a conversion using a sine function such as y=sin ((π/2)·|x|).

Figure 5:
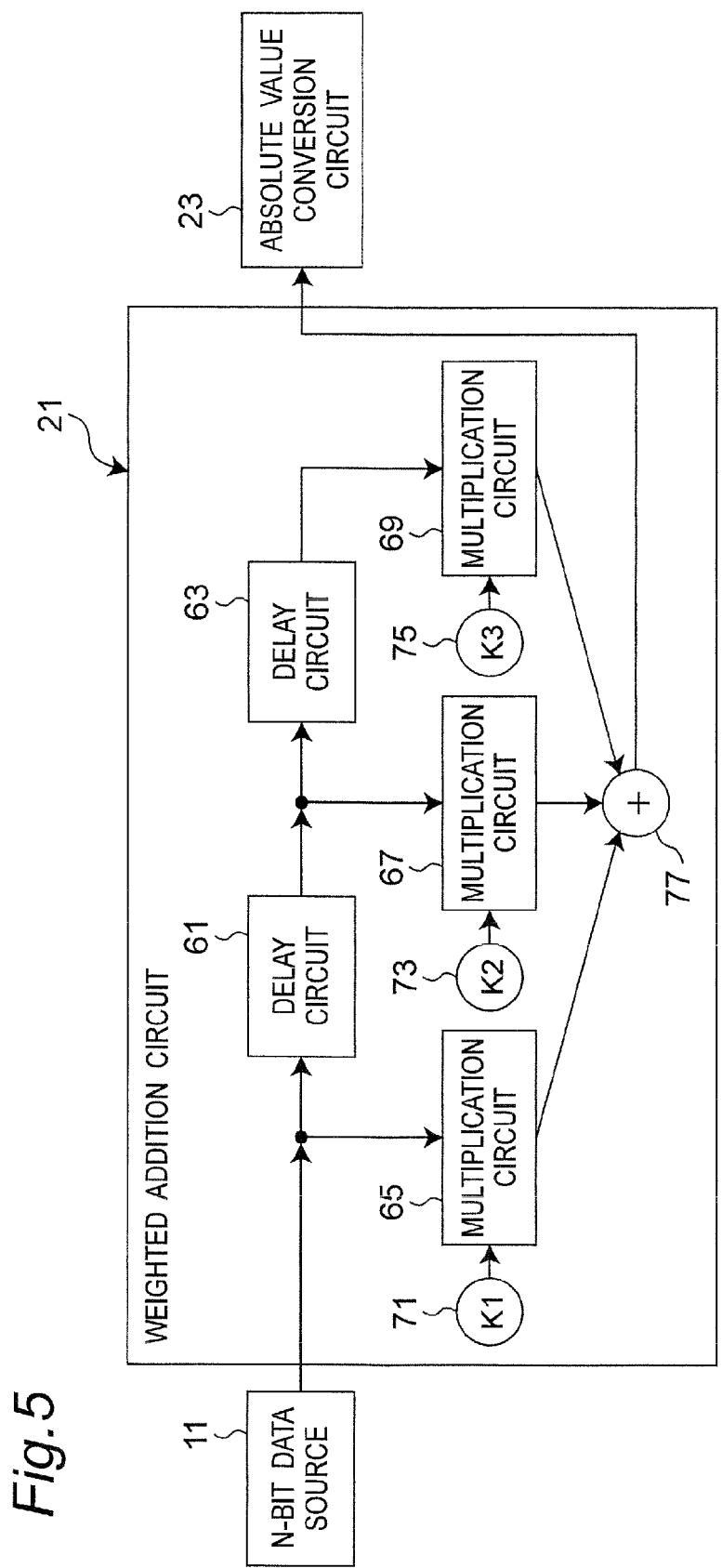
FIG. 5 is a block diagram of a weighted addition circuit.

FIG. 5 is a block diagram showing a configuration of the weighted addition circuit 21 of the audio signal processor 101*a* according to the present embodiment. The weighted addition circuit 21 has an input terminal being operable to receive an output from the N-bit data source 11, delay circuits 61 and 63, multiplication circuits 65, 67, and 69, an addition circuit 77 being operable to perform an addition of outputs from the multiplication circuits 65, 67, and 69, and an output terminal being operable to output an output from the addition circuit 77 to the absolute value conversion circuit 23. The multiplication factor holding units 71, 73, 75 are connected to the multiplication circuits 65, 67, and 69 so as to output multiplication factors being held therein.

Processing sequence in the weighted addition circuit 21 of the audio signal processor 101*a* will be described.

First, an input signal (x(t)) is inputted into the input terminal, and outputted to the delay circuit 61 and the multiplication circuit 65.

Then, the multiplication circuit 65 performs multiplication of an input signal (x(t+(1/f)), f: sampling frequency) and a multiplication factor (K1) being held in the multiplication factor holding unit 71, and outputs the obtained value to the addition circuit 77. The multiplication circuit 67 performs multiplication of an output from the delay circuit 61 (x(t)) and a multiplication factor (K2) being held in the multiplication factor holding unit 73, and outputs the obtained value to the addition circuit 77. The multiplication circuit 69 performs multiplication of an output from the delay circuit 63 (x(t−(1/f)), f: sampling frequency) and a multiplication factor (K3) being held in the multiplication factor holding unit 75, and outputs the obtained value to the addition circuit 77. Here, the output (x(t−(1/f))) of the delay circuit 63, the output (x(t)) of the delay circuit 61 and the input signal (x(t+(1/f))) denote signals respectively representing sampled data of a sampling target (e.g. sound) sampled at different times (sampling timings). For example, the output from the delay circuit 61 (x(t)) is a first input signal representing sampled data of the sampling target sampled at a first time (sampling timing) t. The output from the delay circuit 63 (x(t−(1/f))) or the input signal (x(t+(1/f))) is a second input signal representing sampled data of the sampling target sampled at a time (second time (sampling timing)) t−(1/f) or t+(1/f) being different from the first time (sampling timing) t. In short, the second input signal is a signal being time-shifted with respect to the first input signal. The second input signal being time-shifted with respect to the first input signal means that the sampling timings are different between the first input signal and the second input signal.

Here, the second input signal may be delayed with respect to the first input signal, or the first input signal may be delayed with respect to the second input signal. Either the first input signal or the second input signal may be sampled data of the sampling target sampled at the same sampling timing as that of the input signal processed in the N-bit-to-M-bit conversion circuit 15. Alternatively, neither the first input signal nor the second input signal may be the sampled data of the sampling target sampled at the same sampling timing as that of the input signal processed in the N-bit-to-M-bit conversion circuit 15.

Then, the addition circuit 77 performs addition of the outputs from the multiplication circuit 65, the multiplication circuit 67, and the output of the multiplication circuit 69, and outputs the obtained value to the absolute value conversion circuit 23 through the output terminal. It is assumed here that the delay circuit 61 provides the input signal with a delay of a unit sample time and outputs the signal, and the delay circuit 63 provides the output of the delay circuit 61 with a delay of a unit sample time and outputs the output. The delay time provided by the delay circuits 61 and 63 may be equal to the integral multiple of the unit sample time. Adjusting the delay time generated by the delay circuits 61 and 63 can arbitrarily configure the combination of the input signals to be added in the weighted addition circuit 21.

When values of ¼, ½, and ¼ are set to the multiplication factor K1, the multiplication factor K2, and the multiplication factor K3, smoothing processing using input signals representing one precedent sample and one subsequent sample can be carried out, for example.

Further, when values of −¼, ³⁄₂, and −¼ are set to the multiplication factor K1, the multiplication factor K2, and the multiplication factor K3, differential processing using input signals representing one precedent sample and one subsequent sample can be carried out, for example.

In the case where weighted addition on data x($t_0$) being sampled at the time t=$t_0$ is carried out by the example of the weighted addition circuit 21 depicted in FIG. 5 using three input signals of x including input signals ((x($t_0$−(1/f)) and x($t_0$+(1/f)), f: sampling frequency) sampled at precedent and subsequent sampling times, the delay circuit 13 (FIG. 1) may compensate for the delay provided by the weighted addition circuit 21 by providing the input signal x with a delay of unit sample time (1/f). Alternatively, the weighted addition on the data x($t_0$) being sampled at the time t=$t_0$ may be carried out by the weighted addition circuit 21 using three input signals of x including input signals ((x($t_0$+(1/f)) and x($t_0$+2(1/f)), f: sampling frequency) sampled at subsequent sampling times. It should be noted that in the case where the weighted addition on the data x($t_0$) being sampled at the time t=$t_0$ is carried out by the weighted addition circuit 21 using three input signals of x including input signals ((x($t_0$−2(1/f)) and x($t_0$−(1/f)), f: sampling frequency) sampled at precedent sampling times, the delay circuit 13 (FIG. 1) does not have to provide the input signal x with a delay. Further, the weighted addition circuit 21 may perform the weighted addition operation using two input signals or four or more input signals.

Figure 6:
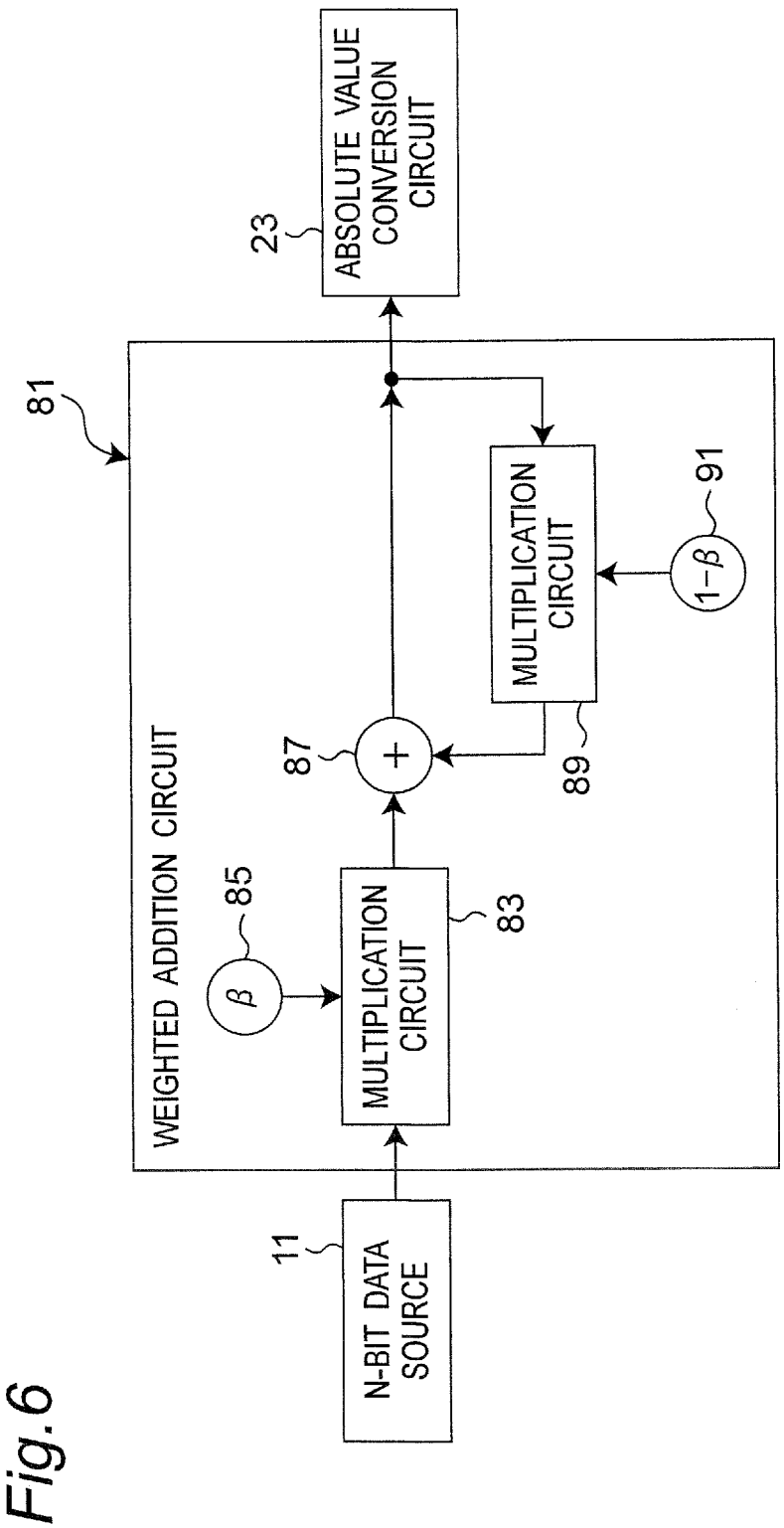
FIG. 6 is a block diagram of another example of a weighted addition circuit.

FIG. 6 is a block diagram showing a configuration of another example of the weighted addition circuit 21 of the audio signal processor 101*a* according to the present embodiment. A weighted addition circuit 81 has an input terminal being operable to receive an output from the N-bit data source 11, multiplication circuits 83 and 89, multiplication factor holding units 85 and 91, an addition circuit 87, and an output terminal being operable to output an output from the addition circuit 87 to the absolute value conversion circuit 23. The multiplication factor holding units 85 and 91 are connected to the multiplication circuits 83 and 89 so as to output the multiplication factors being held therein.

Processing sequence in the weighted addition circuit 81 of the audio signal processor 101a will be described.

First, an input signal is inputted into the input terminal, and outputted to the multiplication circuit 83.

Subsequently, the multiplication circuit 83 performs multiplication of the input signal and a multiplication factor ($\beta$) held in the multiplication factor holding unit 85, and outputs the result to the addition circuit 87.

Then, the addition circuit 87 performs addition of the output from the multiplication circuit 83 and the output from the multiplication circuit 89, and outputs the result to the absolute value conversion circuit 23 via the output terminal. Here, the multiplication circuit 89 performs multiplication of the output and a multiplication factor ($1-\beta$) held in the multiplication factor holding unit 91, and outputs the result to the addition circuit 87.

When the multiplication factor ($\beta$) and ($1-\beta$) are set to values of ¼ and ¾ respectively, for example, exponential smoothing processing can be carried out onto the input signal stream.

(Flowchart)

Figure 7:
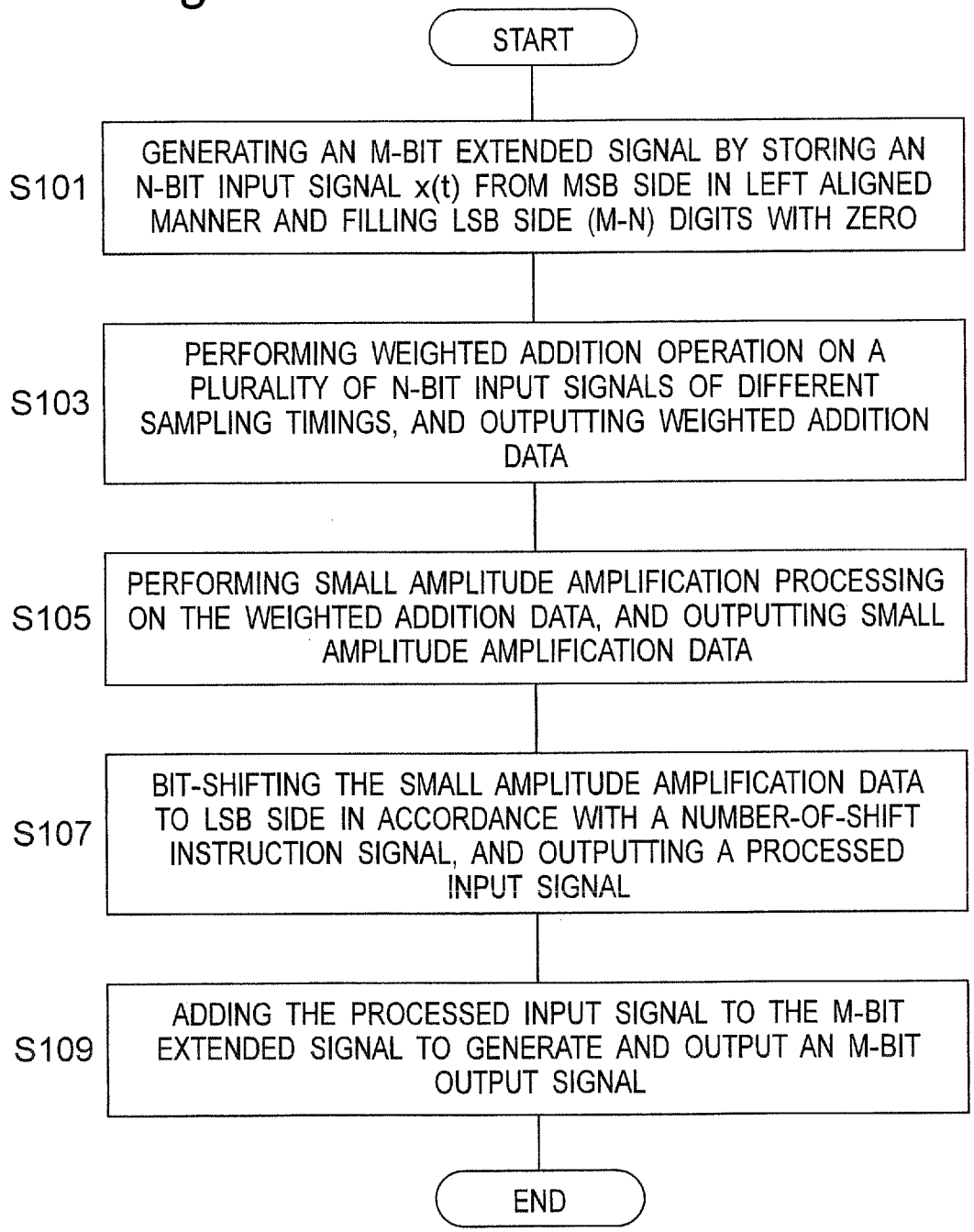
FIG. 7 is a flowchart of bit extension processing performed by the audio signal processor according to the first embodiment.

FIG. 7 is a flowchart of digital data processing performed by the audio signal processor 101a according to the present embodiment.

In step S101, the N-bit-to-M-bit conversion circuit 15 stores the N-bit input signal x(t) from the MSB side in a left aligned manner and fills (M−N) digits on the LSB side with zeroes so as to generate the M-bit input signal $x_m(t)$ having M bits being extended.

In step S103, the weighted addition circuit 21 performs weighted addition operation on a plurality of the input signals at different sampling timings (e.g. x(t−1/f), x(t), x(t+1/f), f: sampling frequency), and outputs the weighted added input signal $x_w(t)$.

In step S105, the small amplitude signal amplification unit 41 performs a small amplitude amplification processing on the weighted added input signal $x_w(t)$, and outputs a small amplitude amplified input signal (signed logarithmic conversion signal $x_{ls}(t)$ in the above example).

In step S107, the arithmetic shift circuit 31 shifts the small amplitude amplified input signal rightward (to the LSB side) for the number of shifts directed by the number-of-shift deciding unit 33, and outputs the processed input signal $x_p(t)$.

Lastly, in step S109, the adding circuit 17 performs addition of the M-bit input signal $x_m(t)$ and the processed input signal $x_p(t)$, and outputs the obtained signal as the M-bit output signal.

As thus described, according to the present embodiment, the arithmetic shift circuit 31 generates and outputs M-bit data by performing an arithmetic right shift on the N-bit input signal for a predetermined number of shifts, e.g. N−1 bits, the N-bit-to-M-bit conversion circuit 15 outputs an input signal converted into M-bits by filling zero of M−N bits on the LSB side, and the adding circuit 17 performs addition of the output from the arithmetic shift circuit 31 and the output from the N-bit-to-M-bit conversion circuit 15 so as to fill the blanks of M−N bits on the LSB side, thereby exerting the effect of expanding the dynamic range.

Moreover, according to the present embodiment, before the arithmetic shift circuit 31 performs the arithmetic shift on the input signal, the absolute value conversion circuit 23 constituting the small amplitude signal amplification unit 41 converts the input signal into an absolute value, the logarithmic conversion circuit 25 further converts the absolute-valued input signal, having been converted by the absolute value conversion circuit 23, into a logarithm, and the sign reflection circuit 27 provides the output from the logarithmic conversion circuit 25 with the same sign as that of the input signal. Hence, a signal having a small level (small amplitude) in both of positive/negative polarities is relatively more emphasized in comparison with a signal having a large level (large amplitude), thereby exerting more easily-audible effect according to the bit-extension on an input signal having a small revel.

According to the present embodiment, further, the logarithmic conversion circuit 25 is able to perform an operation of $y=2|x|-x^2$. Accordingly, an approximated logarithm operation is achieved in a simplified manner. In addition, in a case where the input signal being converted into its absolute value varies in the range of $0 \leq |x| < 1$, the output from the logarithmic conversion circuit 25 also varies in the range of $0 \leq y < 1$, thereby the amplitude can easily be controlled. Further, As in this example, there is an effect that, when the adding circuit 17 performs addition of the input signal and a signal having been undergone the arithmetic right shift for a predetermined shift amount, e.g. N−1 bits, by the arithmetic shift circuit 31 to achieve the bit-extension, no overflow occurs.

According to the present embodiment, the logarithmic conversion circuit 25 is able to perform an operation of $y=2|x|-x^2$. Accordingly, an approximated logarithm operation is achieved in a simplified manner. In addition to that, a nonlinear term (the term of $x^2$) generates harmonics so that high-frequency components having lost due to sampling and compression coding can be compensated.

According to the present embodiment, further, the number of shifts performed by the arithmetic shift circuit 31 can be changed from outside, and hence the amplitude of the signal which is used to fill the blank of M−N bits on the LSB side can be changed in accordance with the change of the number of shifts. Consequently, adjustment of the dynamic range and acoustic audible effect is made possible. For example, in the case where it is desired to greatly expand the dynamic range, it can be achieved by making the number of rightward-shifts smaller, and in the case where it is desired to expand the dynamic range not so much, it can be achieved by making the number of rightward-shifts larger.

According to the present embodiment, further, the weighted addition circuit 21 performs weighted addition on an input signal using temporally precedent and subsequent input signals, and the resultant of the weighted addition is used to fill the blank of M−N bits on the LSB side of M bits. In a case where the multiplication factors K1, K2, K3 of the weighted addition circuit 21 of FIG. 5 are set to values for smoothing the input, the output from the arithmetic shift circuit 31 becomes more insusceptible to a high-frequency noise in the input signal. Thus, it prevents an adverse effect to the audio quality due to excessive temporal variations in the LSB bits. In a case where the multiplication factors K1, K2, K3 of the weighted addition circuit 21 of FIG. 5 are set to values for differentiating the input, the output from the arithmetic shift circuit 31 emphasizes an amplitude change of the input signal. Thus, it provides a more-inflected sound image. In a case where the multiplication factors K1, K2, K3 of the weighted addition circuit 21 of FIG. 5 are set to values for simulating human auditory sense having a bandpass characteristic with low sensitivity at low and high frequency bands, the output of the arithmetic shift circuit 31 emphasizes the frequency band of the input signal at which the human auditory sense has high sensitivity. Thus, it allows to provide a listener-friendly sound image.

According to the present embodiment, in a case where the multiplication factors $\beta$, ($1-\beta$) of the weighted addition circuit 81 of FIG. 6 are set to values for smoothing the input, the output from the arithmetic shift circuit 31 becomes more insusceptible to a high-frequency noise in the input signal. Thus, it prevents an adverse effect to the audio quality due to excessive temporal variations in the LSB bits and, when successive input signals have an identical sign, the weighted addition circuit 81 outputs a large amplitude signal having the identical sign. Thus, the output from the weighted addition circuit 81 emphasizes an amplitude change of the input signal and provides a more-inflected sound image. Furthermore, only precedent signals are used to smooth the input signal and, hence, no delay occurs, thereby the need for the delay circuit 13 is eliminated.

It is to be noted that operations, in which: the absolute value conversion circuit 23 converts the input signal into an absolute value; the logarithmic conversion circuit 25 converts the absolute-valued input signal, having been converted by the absolute value conversion circuit 23, into a logarithm; and the sign reflection circuit 27 provides the output from the logarithmic conversion circuit 25 with the same sign as that of the input signal, are performed in the present embodiment so as to relatively emphasize a small-level signal to make it easy to be heard. However, these operations may be omitted. In this case, it is possible to extend the N-bit input signal to M bits with a smaller amount of operations.

It is to be noted that in the present embodiment, the weighted addition circuit 21 or 81 performs the smoothing processing or the differential processing on the input signal to suppress the influence due to a higher frequency component of the input signal or emphasize the amplitude change of the input signal, but these processes may be omitted. In such case, it is possible not only to extend the N-bit input signal to M bits with a smaller amount of operations, but also to omit the delay circuit 13.

In the present embodiment, the arithmetic shift circuit 31 outputs the M-bit data which is obtained through an arithmetic right shift for N−1 bits on the N-bit input signal, for example, the N-bit-to-M-bit conversion circuit 15 outputs an M-bit input signal which is obtained through filling M−N bits on its LSB side with zero, and the adding circuit 17 performs addition of the output from the arithmetic shift circuit 31 and the output from the N-bit-to-M-bit conversion circuit 15, so that an N-bit input signal can be extended to M bits. It is to be noted that, in addition, by increasing a sampling frequency at an upstream of the input terminal or a downstream of the output terminal, it can also broaden the frequency range simultaneously with the extension of the number of quantization bits (bit depth). Especially in the case of increasing the sampling frequency at an upstream of the input terminal, a harmonic being generated by the nonlinear effect of the logarithmic conversion circuit 25 spreads out to a higher frequency so that the input signal can be reproduced with a frequency range which has a broader frequency range than that the original input signal has.

Although, in the present embodiment, the weighted addition processing is performed by use of the input signal and signals being precedent and subsequent to the input signal. It is to be noted that, the number of samples to be employed may be increased in this processing. In this case, it is possible to improve frequency separation characteristics in the weighted addition.

In addition, although the delay circuit 13 compensates for the delay time that occurs in the weighted addition circuit 21 in the present embodiment, the output from the N-bit-to-M-bit conversion circuit 15 as the input signal and the output from the arithmetic shift circuit 31 as the signal to fill blanks of the M−N bits on the LSB side may be intentionally time-shifted. In this case, it is possible to achieve the audio quality improvement by provision of reverberation.

Second Embodiment

Figure 8:
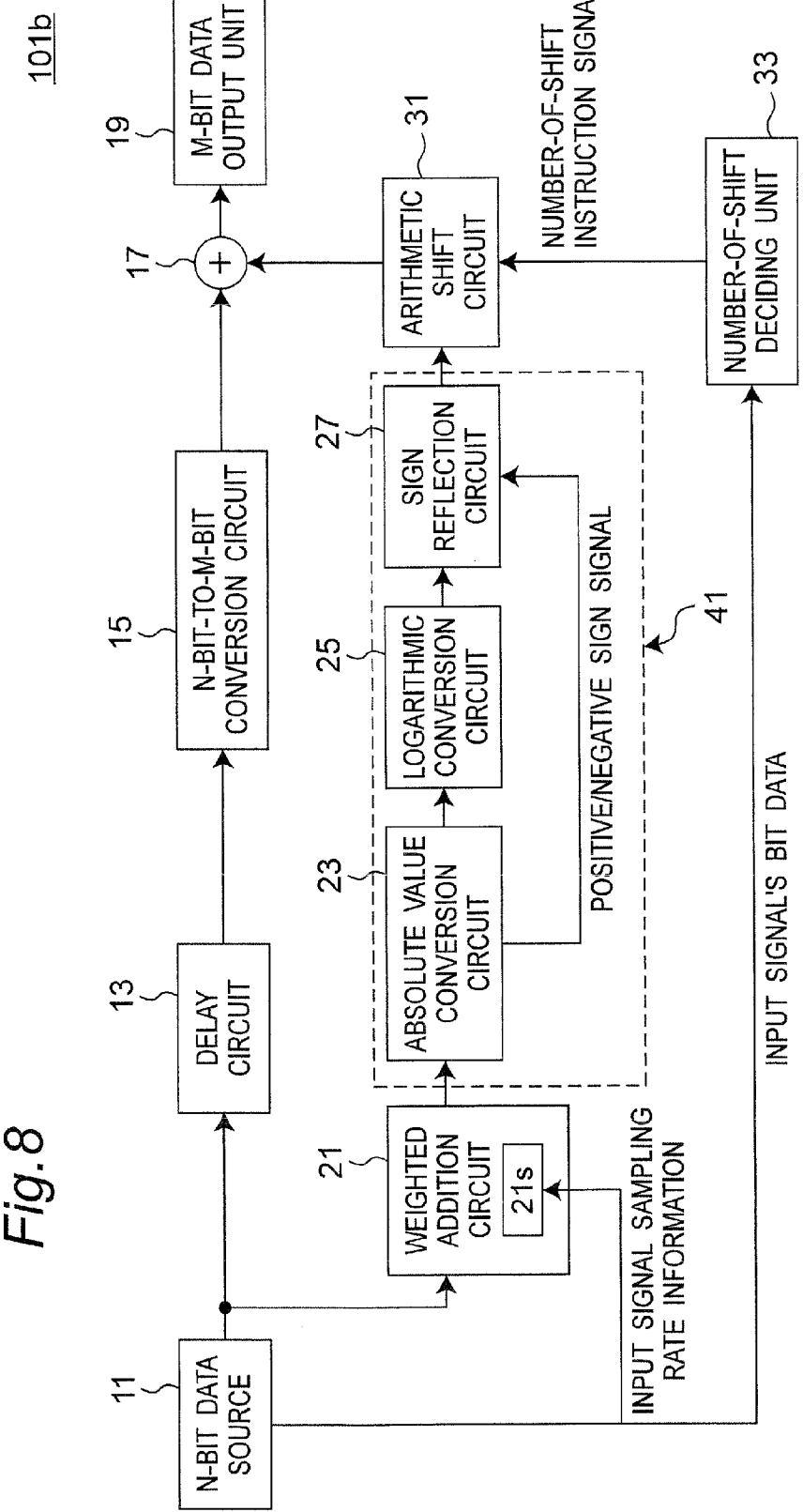
FIG. 8 is a block diagram of an audio signal processor according to a second embodiment of the present invention.

FIG. 8 is a block diagram of a configuration of an audio signal processor 101b according to a second embodiment. In addition to the components of the audio signal processor 101a according to the first embodiment, the audio signal processor 101b further includes a weighted addition operation control unit 21s which receives information on a sampling rate of an input signal being outputted from the N-bit data source 11 and, on the basis of the sampling rate information, controls an weighted addition operation performed by the weighted addition circuit 21. Moreover, the number-of-shift deciding unit 33 is able to decide the number of shifts based upon the number of bits of the input signal outputted from the N-bit data source 11.

Below, a control sequence performed by the weighted addition operation control unit 21s will be described.

The weighted addition operation control unit 21s receives the information on the sampling rate of the input signal from the N-bit data source 11.

Figure 9:
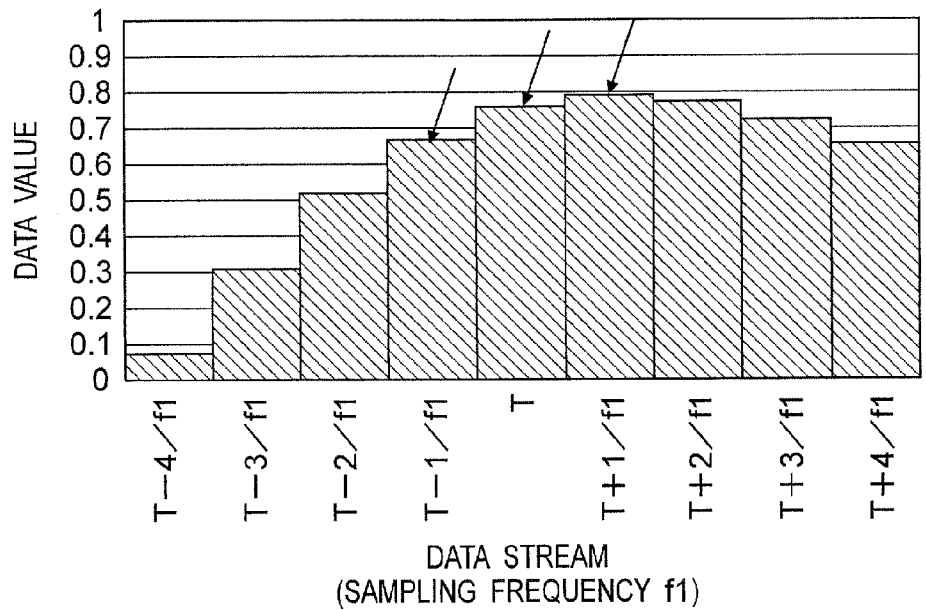
FIGS. 9, 10, and 11 are diagrams illustrating an input signal used for the weighted addition.

FIG. 9 is a diagram illustrating an example of a weighted addition operation performed under the control of the weighted addition operation control unit 21s in the case where the sampling rate of the input signal is $f_1$ (e.g. 48 kHz). When the sampling rate of the input signal is lower than a predetermined value, the weighted addition operation control unit 21s performs the weighted operation with input signals within a time width of $2(1/f_1)$ with respect to the sampled timings, that is, with the use of three input signals (data indicated with arrows in the figure) corresponding to the three points of the sampled timings.

Figure 10:
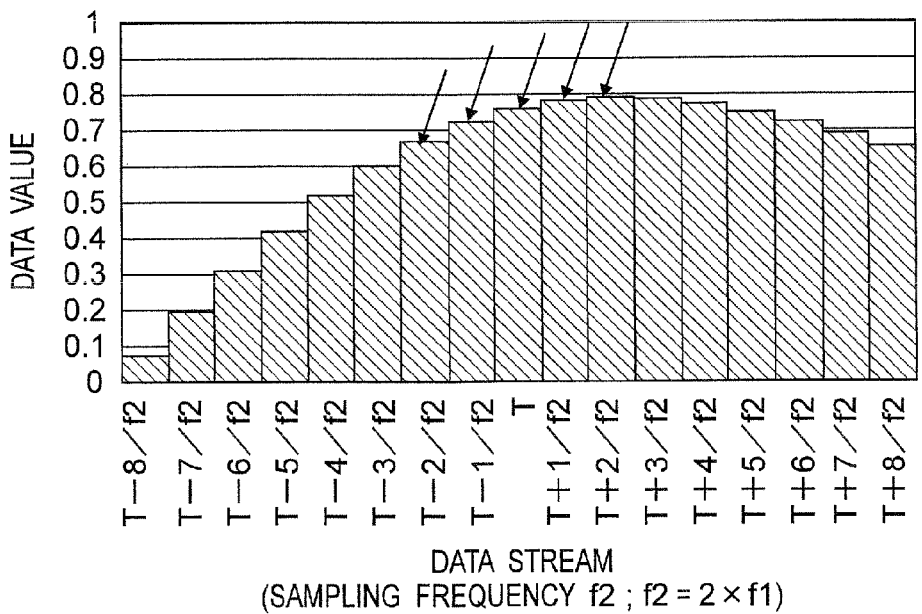

Next, FIG. 10 is a diagram illustrating an example of a weighted addition operation performed under the control of the weighted addition operation control unit 21s in the case where the sampling rate of the input signal being $f_2$ (e.g. 96 kHz ($=2f_1$)) When the sampling rate of the input signal is higher than the predetermined value, the weighted addition operation control unit 21s performs the weighted operation with input signals within in a time width of $4(1/f_2)$ ($=2(1/f_1)$) with respect to the sampled timing, that is, with the use of five input signals (data indicated with arrows in the figure) corresponding to five points of sampled timings.

As thus described, it is possible to obtain a certain amount of effect between input signals of different sampling rates by performing the weighted operation on signals within the same time width with respect to the sampled timing so as to compensate for difference in the amount of the effect exerted by the weighted operation due to a difference in sampling rate. It should be noted that a multiplication factor of the weighted addition circuit 21 may be changed in accordance with the sampling rate of the input signal. This makes it possible to obtain a frequency characteristic of the weighted addition circuit 21 in accordance with the sampling frequency.

Figure 11:
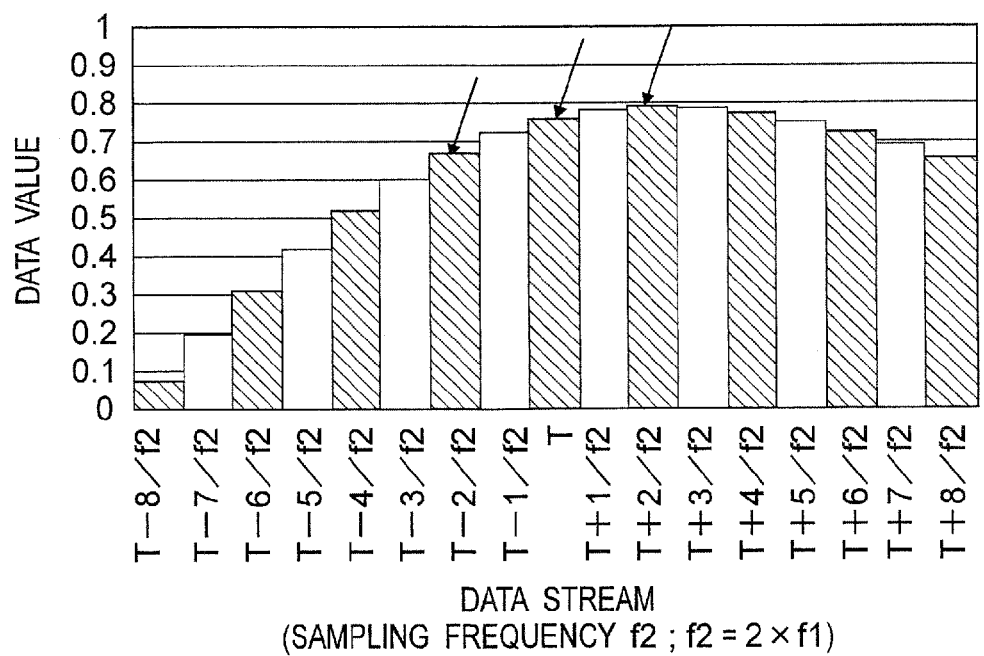

FIG. 11 is a diagram illustrating another example of the weighted addition operation performed under the control of the weighted addition operation control unit 21s in the case where the sampling rate of the input signal is $f_2$ (e.g. 96 kHz ($=2f_1$)). The weighted addition operation control unit 21s performs the weighted operation with three input signals included in the time width of $4(1/f_2)$ ($=2(1/f_1)$) with respect to the sampled timing even when the sampling rate of the input signal is higher than the predetermined value, that is, with the use of input signals corresponding to the three points of sampled timings (data indicated with arrows in the figure).

This makes it possible to compensate for the difference in the amount of the effect exerted by the weighted operation due to the difference in sampling rate with the same level of computational load.

Further, the number-of-shift deciding unit 33 of the audio signal processor 101b according to the second embodiment can decide the number of shifts based upon the number of bits of the input signal. For example, in the case where the number of bits on the output side is fixed to M (=32) bits, the number of shifts may be automatically changed between the case of the number of bits on the input side being $N_1$ (=16) and the case of the number of bits on the input side being $N_2$ (=24). This can hold an amount of the dynamic range expansion effect constant regardless of a difference in number of bits at the input side. For example, the number-of-shift deciding unit 33 can automatically decide the number of shifts as $N_1$ in the case of M=32 (constant) and the number of bits on the input side being $N_1$, and decide the number of shifts as $N_2$ in the case of M=32 (constant) and the number of bits on the input side being $N_2$.

Third Embodiment

Figure 12:
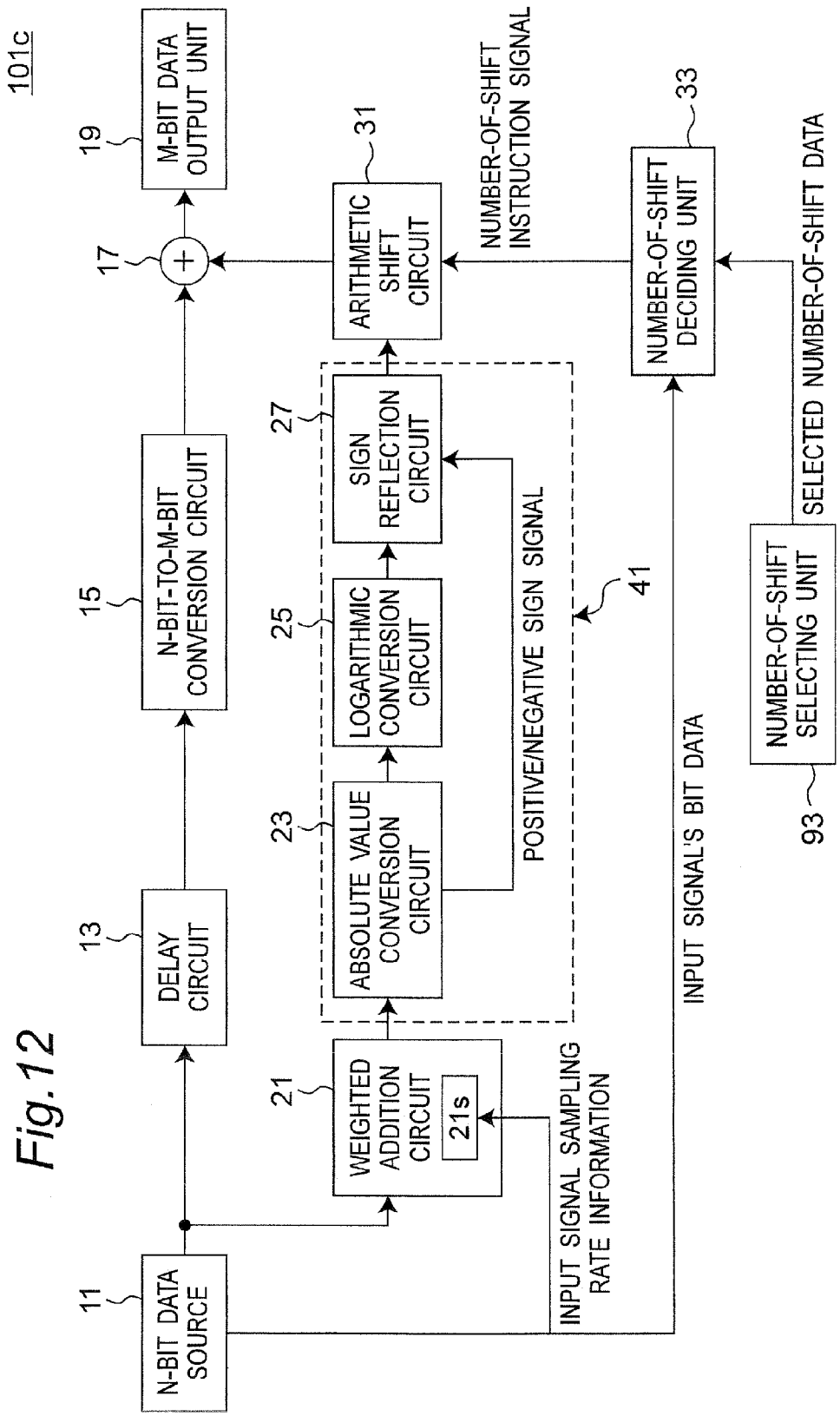
FIG. 12 is a block diagram of an audio signal processor according to a third embodiment of the present invention.

FIG. 12 is a block diagram of a configuration of an audio signal processor 101c according to a third embodiment. In addition to a configuration equivalent to the configurations of the audio signal processor 101a and 101b according to the first and second embodiments, the audio signal processor 101c further includes a number-of-shift selecting unit 93 which receives an input from outside (e.g. an input from a user) and outputs a signal based upon the input (the selected number-of-shifts data) to the number-of-shift deciding unit 33.

As already described with reference to FIG. 2, the number of shifts in the shift operation performed by the number-of-shift deciding unit 33 (the number of digits of the rightward bit shift) has a close relation with the amount of the dynamic range expansion effect and the quality improvement effect. Therefore, the audio signal processor 101c according to the present embodiment is provided with the number-of-shift selecting unit 93 which accepts a selection of the user regarding the amount of the dynamic range expansion effect and the audio quality improvement effect, for example, so that a user can choose the magnitude of those effects.

In such a manner, the audio signal processor 101c allows the user to arbitrarily set the amount of the dynamic range expansion effect and the audio quality improvement effect, especially the magnitude of the effect in hearing.

As thus described, according to the audio signal processors 101a to 101c of the above-mentioned embodiments, in order to extend the N-bit input signal to M-bit (N<M), the arithmetic shift circuit performs an arithmetic rightward shift on the input signal for a predetermined number of digits (e.g. N−1 bits), and the addition circuit performs addition of the input signal and the output from the arithmetic shift circuit to fill blanks of the M−N bits on the LSB side so that the dynamic range may be expanded.

Further, according to the audio signal processors 101a to 101c of the above-mentioned embodiments, the number of shifts by the arithmetic shift circuit can be configured from outside. Hence, in the case where greater dynamic range expansion is desired, it can be achieved by configuring the number of rightward shifts smaller, and in the case where smaller dynamic range expansion is desired, it can be achieved by making the number of rightward shifts larger. Thus the amount of the effect can be arbitrarily adjusted.

Further, according to the audio signal processors 101a to 101c of the above-mentioned embodiments, the weighted addition circuit may perform the weighted addition on a plurality of samples located temporally close to the N-bits input signal using the multiplication factors for temporally smoothing, for example, thereby to prevent a noise of a high frequency from being emphasized.

Further, according to the audio signal processors 101a to 101c of the above-mentioned embodiments, in the conversion circuit, the absolute value conversion circuit firstly converts the output from the weighted addition circuit into an absolute value, the logarithmic conversion circuit subsequently converts the output from the absolute value conversion circuit into a logarithm, and the sign reflection circuit provides the output from the logarithmic conversion circuit with the same sign as that of the input to the absolute value conversion circuit. Hence a signal having a small level in both of positive/negative polarities is relatively more greatly emphasized at a small level in the polarity, thereby making it possible to produce the audio quality improvement effect even with a small sound.

Moreover, according to the audio signal processors 101a to 101c of the above-mentioned embodiments, the logarithmic conversion circuit is able to perform an operation of $y=2|x|-x^2$. Accordingly, an approximated logarithm operation is achieved in a simplified manner. In addition, when the absolute-valued can vary between a range of zero to 1, the output from the logarithmic conversion circuit also varies between the range of zero to 1. In this case, it is possible to extend the bits without occurrence of an overflow even when the output from the arithmetic shift circuit that performs an arithmetic rightward shift for N−1 bits is added to the output from the N-bit-to-M-bit conversion circuit.

As thus described, the audio signal processor 101a to 101c according to the embodiments of the present invention can extend the audio signal quantized with N-bits to M bits (N<M), to obtain an audio signal with high resolution and high quality. Accordingly, it is applicable to applications where audio signals recorded in a disc medium or a semiconductor memory is required to be provided to a listener with higher quality than recorded.

A digital data processor according to the present invention, as well as an audio signal processor as the embodiment thereof, is useful as a processor for processing digital data generated through quantization such as a digital audio signal.

What is claimed is:

1. A digital data processor which receives an N-bit input signal from a data source and converts the N-bit input signal into an M-bit output signal, the M-bit being larger than the N-bit, the digital data processor comprising:
    an weighted addition circuit that is operable to perform weighted addition on at least the input signal and a signal being time-shifted with respect to the input signal and output as a weighted added input signal;
    an arithmetic shift circuit that is operable to perform an arithmetic rightward shift operation on the weighted added input signal for a predetermined number of shifts and output as a processed input signal;
    a bit extension circuit that is operable to attach a predetermined bits to an LSB side of the input signal to generate an intermediate signal of M bits; and
    an addition circuit that is operable to perform addition of the intermediate signal and the processed input signal so as to generate the M-bit output signal.

2. The digital data processor according to claim 1, wherein the predetermined bits that is added to the input signal by said bit extension circuit is zero having (M−N) digits.

3. The digital data processor according to claim 1, wherein the input signal is a signal representing an N-bit quantized digital data which is generated through sampling with a predetermined sampling frequency and quantization,
said weighted addition circuit includes a weighted addition operation control unit that is operable to get information on the sampling frequency of the input signal from the data source, and
said weighted addition operation control unit decides the number of signals to be added in the weighted addition and a factor for the weighted addition based upon the information on the sampling frequency.

4. The digital data processor according to claim 1, further comprising a number-of-shift deciding unit that is operable to direct the number of shifts of the arithmetic rightward shift operation performed by said arithmetic shift circuit,
wherein said number-of-shift deciding unit is operable to get information on the number of bits of the input signal from the data source and decides the number of shifts of the arithmetic rightward shift operation performed by said arithmetic shift circuit based upon the information on the number of bits.

5. The digital data processor according to claim 4, wherein said number-of-shift deciding unit is operable to decide the number of shifts of the arithmetic right shift operation performed by said arithmetic shift circuit such that the number of shifts increases with increase in the number of bits.

6. The digital data processor according to claim 1, further comprising:
a number-of-shift deciding unit that is operable to direct the number of shifts of the arithmetic rightward shift operation performed by said arithmetic shift circuit; and
a number-of-shift selecting unit that is operable to transmit selected number of shifts selected by a user to said number-of-shift deciding unit,
wherein said number-of-shift deciding unit is operable to decide the number of shifts of the arithmetic rightward shift operation performed by said arithmetic shift circuit based upon the selected number of shifts.

7. A digital data processor which receives an N-bit input signal from a data source and converts the N-bit input signal into an M-bit output signal, the M-bit being larger than the N-bit, the digital data processor comprising:
an amplification circuit that is operable to receive the input signal, multiply a value of the input signal by a magnification ratio which is determined in accordance with an absolute value of the value of the input signal, and output as a conversion signal;
an arithmetic shift circuit that is operable to perform an arithmetic rightward shift operation on the conversion signal for a predetermined number of shifts and output as a processed input signal;
a bit extension circuit that is operable to attach a predetermined bits to an LSB side of the input signal to generate an intermediate signal of M bits; and
an addition circuit that is operable to perform addition of the intermediate signal and the processed input signal to generate the M-bit output signal.

8. The digital data processor according to claim 7, wherein said amplification circuit is operable to output a logarithm of the absolute value of the value of the input signal as the conversion signal.

9. The digital data processor according to claim 7, wherein said amplification circuit is operable to output a value as the conversion signal which is obtained through subtracting a value obtained by doubling the absolute value of the value of the input signal from a value obtained by squaring the value of the input signal.

10. The digital data processor according to claim 7, further comprising a number-of-shift deciding unit that is operable to direct the number of shifts of the arithmetic rightward shift operation performed by said arithmetic shift circuit,
wherein said number-of-shift deciding unit is operable to get information on the number of bits of the input signal from the data source and decides the number of shifts of the arithmetic rightward shift operation performed by said arithmetic shift circuit based upon the information on the number of bits.

11. The digital data processor according to claim 10, wherein the number-of-shift deciding unit decides the number of shifts of the arithmetic rightward shift operation performed by said arithmetic shift circuit such that the number of shifts increases with increase in the number of bits.

12. The digital data processor according to claim 7, further comprising:
a number-of-shift deciding unit that is operable to direct the number of shifts of the arithmetic rightward shift operation performed by said arithmetic shift circuit; and
a number-of-shift selecting unit that is operable to transmit selected number of shifts selected by a user to said number-of-shift deciding unit,
wherein said number-of-shift deciding unit is operable to decide the number of shifts of the arithmetic rightward shift operation performed by said arithmetic shift circuit based upon the selected number of shifts.

13. A data processing method which a digital data processor performs, the digital data processor receiving an input signal stream including an N-bit input signal from a data source and converting the N-bit input signal into an M-bit output signal, the M-bit being larger than the N-bit, the method comprising:
performing weighted addition of at least the input signal and a signal being time-shifted with respect to the input signal, both being included in the input signal stream to output as a weighted added input signal by a first computation circuit of the digital data processor;
performing an arithmetic rightward shift operation on the weighted added input signal for a predetermined number of shifts to output as a processed input signal by a second computation circuit of the digital data processor;
attaching a predetermined bits to an LSB side of the input signal to generate an intermediate signal of M bits by a third computation circuit of the digital data processor; and
adding the intermediate signal to the processed input signal to generate the M-bit output signal by a fourth computation circuit of the digital data processor.

14. A data processing method which a digital data processor performs, the digital data processor receiving an N-bit input signal from a data source and converting the N-bit input signal into an M-bit output signal, the M-bit being larger than the N-bit, the method comprising:
receiving the input signal and multiplying a value of the input signal by a magnification ratio which is determined in accordance with an absolute value of the value of the input signal to output as a conversion signal by a first computation circuit of the digital data processor;
performing an arithmetic rightward shift operation on the conversion signal for a predetermined number of shifts to output as a processed input signal by a second computation circuit of the digital data processor;

attaching a predetermined bits to an LSB side of the input signal to generate an intermediate signal of M bits by a third computation circuit of the digital data processor; and adding the intermediate signal to the processed input signal to generate the M-bit output signal by a fourth computation circuit of the digital data processor.

* * * * *